(12) United States Patent
Hirayama (10) Patent No.: US 7,218,427 B2
(45) Date of Patent: May 15, 2007

(54) IMAGE READING APPARATUS (75) Inventor: Taiya Hirayama, Ibraki (JP)

(73) Assignee: Canon Kabushiki Kaisha, Tokyo (JP)

( * ) Notice: Subject to any disclaimer, the term of this patent is extended or adjusted under 35 U.S.C. 154(b) by 908 days.

(21) Appl. No.: 10/271,560

(22) Filed: Oct. 17, 2002

(65) Prior Publication Data

US 2003/0081268 A1    May 1, 2003

(30) Foreign Application Priority Data

Oct. 31, 2001    (JP)    ............... 2001-334520

(51) Int. Cl.
*H04N 1/04*    (2006.01)
(52) U.S. Cl. .................. 358/497; 358/474
(58) Field of Classification Search ............ 358/497, 358/494, 474, 471, 483, 482, 487, 505, 506, 358/512–514, 509, 475, 484; 399/211, 212; 250/234–236, 208.1, 239, 216; 382/312, 382/318, 319
See application file for complete search history.

(56) References Cited

U.S. PATENT DOCUMENTS

| 5,610,731 | A |   | 3/1997  | Itoh ................... 358/496 |
| 5,801,851 | A |   | 9/1998  | Sheng .................. 358/497 |
| 5,857,133 | A |   | 1/1999  | Sun .................... 399/211 |
| 5,999,277 | A |   | 12/1999 | Tsai ................... 358/498 |
| 6,005,686 | A | * | 12/1999 | Hong ................... 358/497 |
| 6,008,485 | A |   | 12/1999 | Chiang ................ 250/208.1 |
| 6,137,106 | A |   | 10/2000 | Kao .................... 250/239 |
| 6,594,037 | B1 | * | 7/2003 | Takahashi ............. 358/474 |
| 6,762,864 | B2 | * | 7/2004 | Kao .................... 358/497 |
| 6,888,651 | B2 | * | 5/2005 | Lee .................... 358/497 |
| 6,940,063 | B2 | * | 9/2005 | Spears et al. ......... 250/234 |
| 6,947,186 | B2 | * | 9/2005 | Chang .................. 358/483 |

FOREIGN PATENT DOCUMENTS

| JP | 7193689 | 7/1995 |
| JP | 8-228266 | 9/1996 |
| JP | 8228266 | 9/1996 |
| JP | 08228266 A * | 9/1996 |
| JP | 11289430 | 10/1999 |
| KR | 10-2002-0066313 | 10/2002 |

* cited by examiner

*Primary Examiner*—Cheukfan Lee
(74) *Attorney, Agent, or Firm*—Fitzpatrick, Cella, Harper & Scinto (57) ABSTRACT

An image reading apparatus in which a contact type image sensor (CIS) is pressed by springs to cause abutment members to abut the lower surface of an original support glass, wherein the abutment members are arranged within the main scanning reading range of the CIS and, more specifically, at positions where the deflection amount of the original support glass with respect to the end portions of the main scanning reading range is approximately ½ of the maximum deflection amount. Thus, when the original support glass is deflected, the CIS is pressed down against the spring force by approximately ½ of the maximum deflection amount in the main scanning reading range of the original support glass from the position where the original table has no deflection, whereby the optimum focal position of the CIS is downwardly shifted and as a result, the upper surface of the original support glass constituting the original surface is retained within the effective focus range of the CIS over the entire main scanning reading range, thereby making it possible to perform high quality image reading.

4 Claims, 6 Drawing Sheets

IMAGE READING APPARATUS

BACKGROUND OF THE INVENTION

1. Field of the Invention

The present invention relates to a stationary-original-table type image reading apparatus using a contact type image sensor.

2. Related Background Art

In an image reading apparatus, a charge-coupled device (CCD) image sensor or a contact image sensor or a contact image sensor (hereinafter referred to as CIS) is used. As compared with the CCD image sensor, the CIS has many advantages. For example, it allows a reduction in apparatus size, and its driving system is substantially simplified, so that there is practically no need for adjustment. Further, no image distortion due to the reduction in optical system is generated.

On the other hand, due to the construction of the CIS in which reflected light from the original surface is focused onto a photoreceptor by means of a SELFOC lens array, the CIS has a problem in that the focal depth is rather small and thus the image is likely to be out of focus unless the support structure for the CIS has sufficient accuracy. In view of this problem, Japanese Patent Application Laid-Open No. 07-193689 and U.S. Pat. No. 5,801,851, etc. disclose a method according to which an image is read with the distance between the CIS and the original surface being kept constant by causing rollers, slide members or the like provided at the end portions of the upper surface of the CIS to abut the lower surface of the original support glass, whereby an out-of-focus state is prevented.

In a so-called book scan type image reading apparatus, which reads original image information with the original being fixed onto the original support glass, downward deflection of the original support glass can be generated when a thick original such as a book or a dictionary is placed on the original support glass and pressed by a presser plate. The deflection amount of the original support glass in the main scanning direction is maximum substantially in the central portion between the back end and the front end supports of the original support glass.

In all of the above-mentioned examples, the rollers, slide members or the like are caused to abut the lower surface of the original support glass outside the image reading range at the both ends of the CIS. Thus, of the image reading range of the CIS, the distance between the CIS and the original surface is maintained with accuracy near the both ends of the CIS, whereas in the central portion, an out-of-focus state is likely to be brought about when the original surface comes too close to the CIS beyond the optimum focal position.

Figure 11:
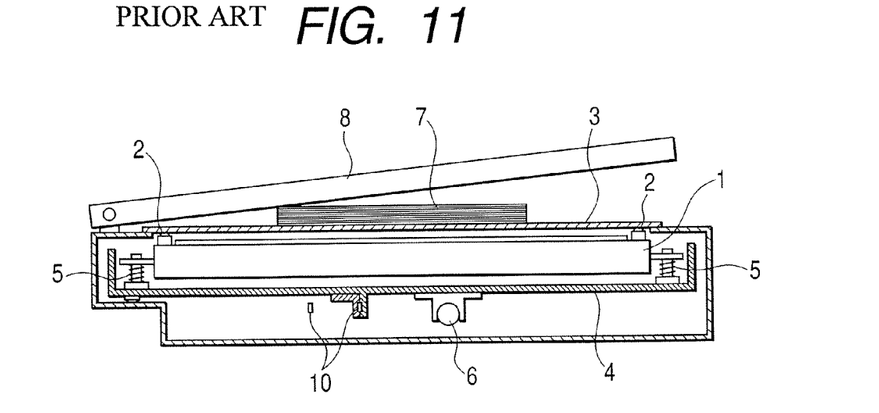
FIG. 11 is a side sectional view of a conventional image reading apparatus.
Figure 12:
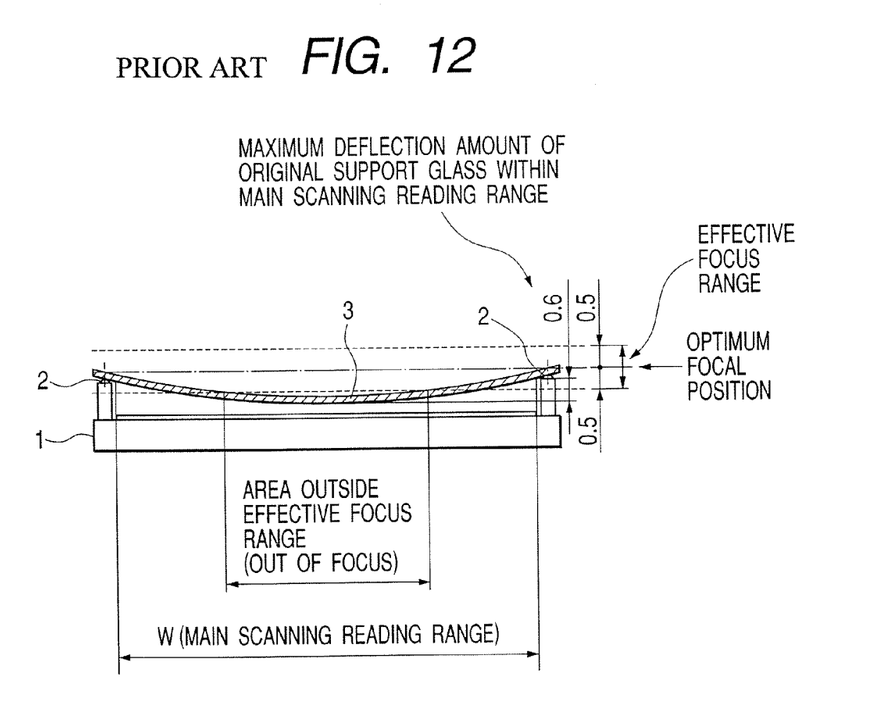
FIG. 12 is a schematic diagram showing a state in which deflection is caused in the original support glass 3 in the conventional image reading apparatus.

FIG. 11 is a side sectional view of a conventional image reading apparatus. FIG. 12 shows how deflection is generated in an original support glass 3 by placing a thick original thereon and pressing it with a presser plate 8. The focal depth of the SELFOC lens mounted to a CIS 1 is ±0.5 mm, and a range of 1 mm across the optimum focal position is the effective focus range. The deflection amount of the original support glass 3 is maximum in the central portion between the end portions of the main scanning reading range of the CIS 1; in this case, it is assumed to be a downward deflection of 0.6 mm.

In the conventional image reading apparatus, abutment members 2 are arranged outside the main scanning reading range. Thus, as shown in FIG. 12, when the deflection amount of the original support glass 3 in the main scanning direction exceeds the effective focus range of the CIS 1, the portion of the upper surface of the original support glass 3 constituting the original surface is deviated from the effective focus range in the vicinity of the central portion of the main scanning reading range, so that an out-of-focus state is caused in this portion, resulting in a deterioration in image quality.

SUMMARY OF THE INVENTION

It is an object of the present invention to make it possible to perform high quality image reading even when the original support glass is deflected.

In order to achieve the above-mentioned object, according to an aspect of the present invention, there is provided an image reading apparatus comprising:

an original table which is transparent and has an upper surface on which an original is placed;
a contact type image sensor arranged on the lower side of the original table;
a sub-scanning unit arranged to move the contact type image sensor in a sub-scanning direction;
abutment members which are provided on the contact type image sensor to maintain a fixed distance between the original table and the contact type image sensor and which are arranged at at least two positions separated from each other by a predetermined distance in the main scanning direction within the main scanning reading range of the contact type image sensor; and
a pressing member arranged to press the contact type image sensor so as to cause the abutment members to abut the lower surface of the original table.

According to another aspect of the present invention, there is provided an image reading apparatus comprising:

a transparent original table having an upper surface on which an original is placed; a contact type image sensor arranged on the lower side of the original table;
a sub-scanning unit for moving the contact type image sensor in a sub-scanning direction;
first abutment members which are provided on the contact type image sensor to maintain a fixed distance between the original table and the contact type image sensor and which are arranged at at least two positions outside the main scanning reading range of the contact type image sensor;
a pressing member for pressing the contact type image sensor so as to cause the first abutment members to abut the lower surface of the original table; and
second abutment members which are provided on the contact type image sensor and arranged within the main scanning reading range of the contact type image sensor and at at least two positions which are vertically spaced apart from the lower surface of the original table by a predetermined distance at least when the original table is not deflected.

Other objects and features of the present invention will be apparent from the following descriptions and the accompanying drawings, in which like reference characters designated the same or similar parts throughout the figures thereof.

DETAILED DESCRIPTION OF THE PREFERRED EMBODIMENTS

Preferred embodiments of the image reading apparatus of the present invention will now be described with reference to the drawings.

First Embodiment

Figure 1:
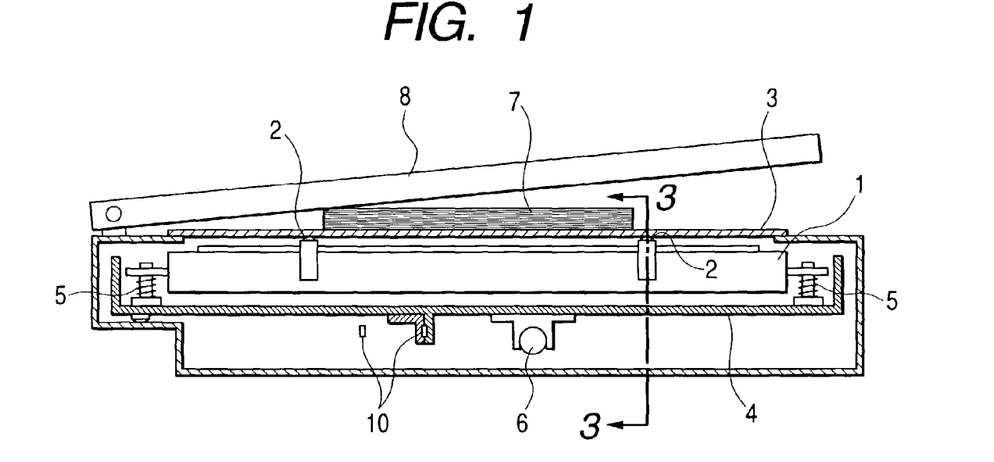
FIG. 1 is a side sectional view of an image reading apparatus according to a first embodiment of the present invention.
Figure 2:
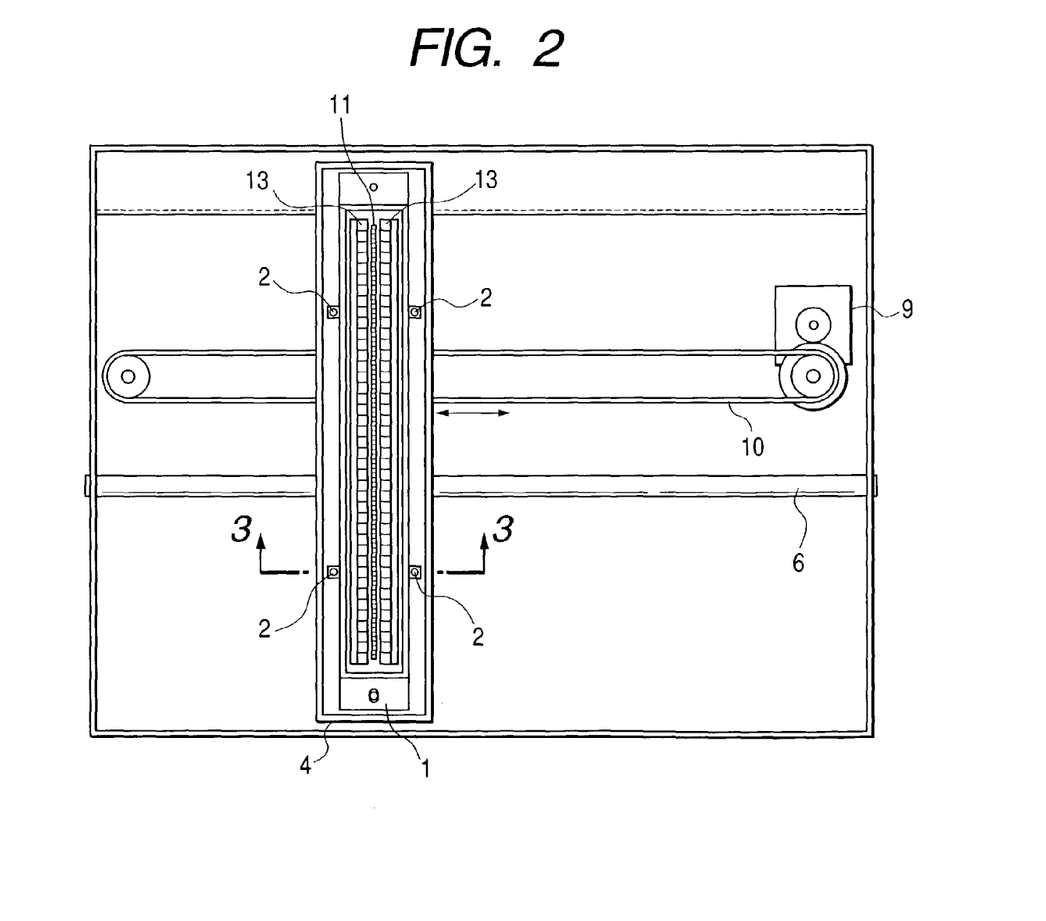
FIG. 2 is a plan view of the image reading apparatus of the first embodiment.
Figure 3:
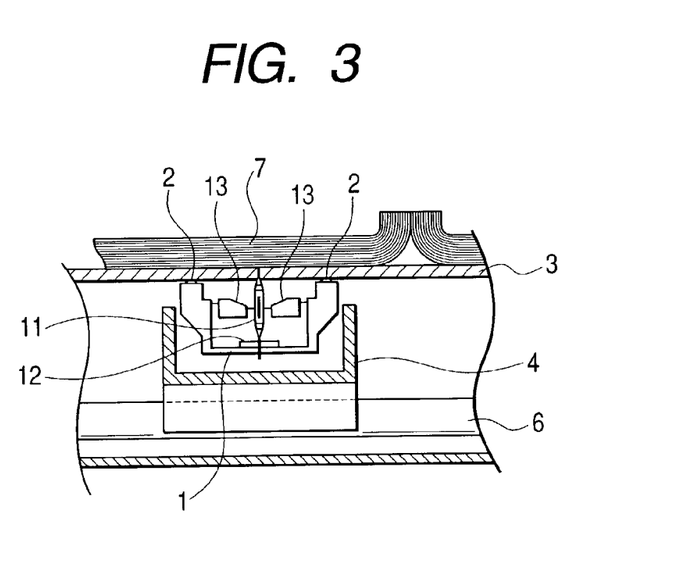
FIG. 3 is a front sectional view taken along the line 3—3 of FIGS. 1 and 2.
Figure 4:
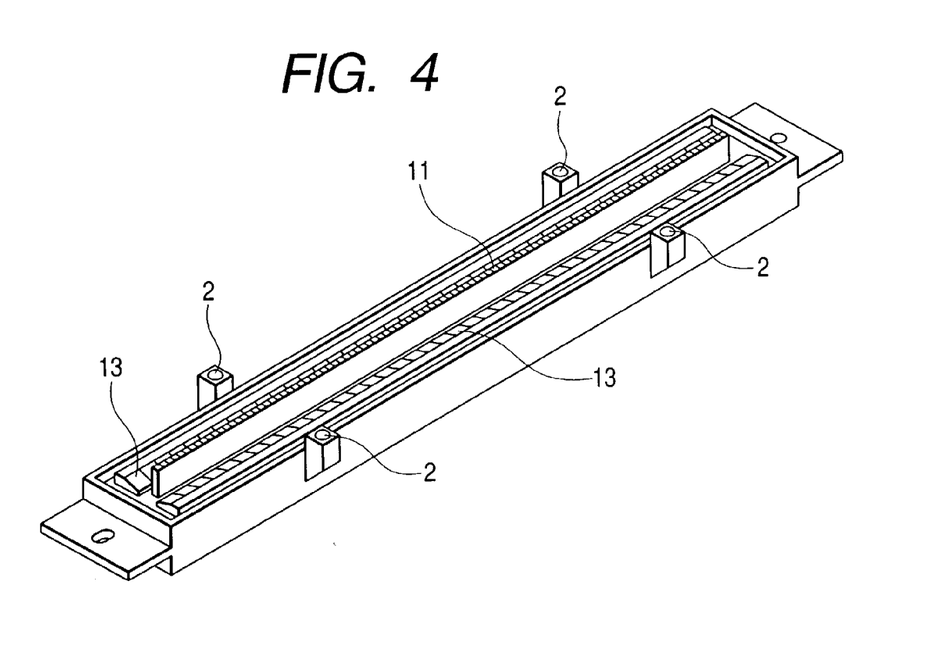
FIG. 4 is a perspective view of a CIS 1 using semi-spherical slide members as abutment members.
Figure 5:
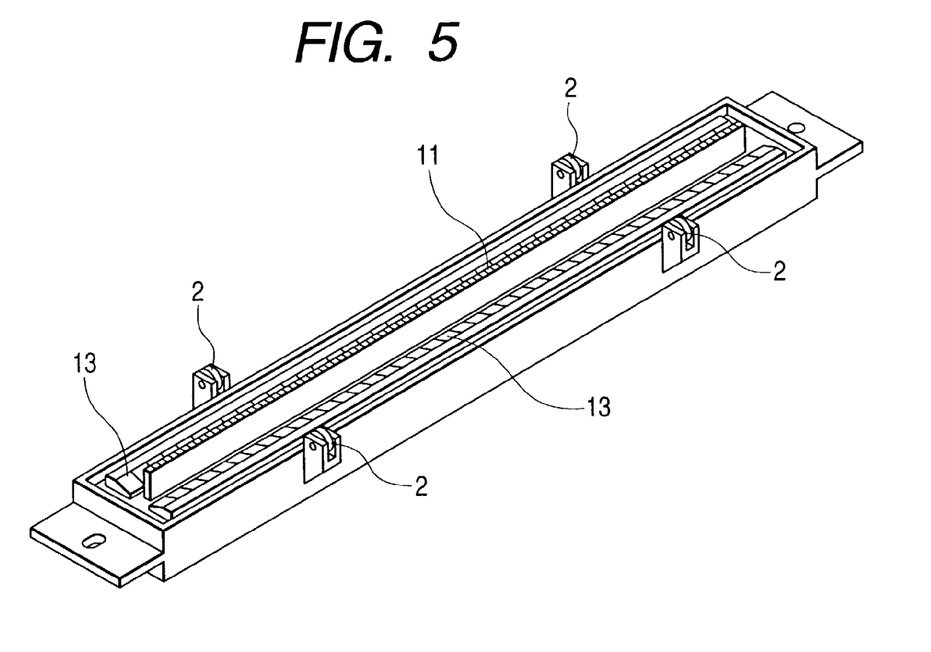
FIG. 5 is a perspective view of a CIS 1 using rollers as abutment members.

FIG. 1 is a side sectional view of an image reading apparatus according to a first embodiment of the present invention; FIG. 2 is a plan view of the same (with the presser plate 8 removed); and FIG. 3 is a front sectional view taken along the line 3—3 of FIGS. 1 and 2. FIGS. 4 and 5 are perspective views of the CIS 1.

As shown in FIGS. 1 through 3, the CIS 1 is mounted in a box-like travel body 4 in the image reading apparatus so as to be freely movable in the vertical directions. In the travel body 4, the end portions of the CIS 1 are upwardly pressed by pressing members such as springs 5, and the CIS 1 abuts the lower surface of the original support glass 3 through the intermediation of abutment members 2 arranged at at least two positions (four positions in this embodiment). The pressing members 5 such as the springs 5 may be provided at positions within the main scanning reading range (described below) of the CIS 1.

The CIS 1 has a casing at the bottom of which photoreceptors 12 are arranged in a line. Reflected light from an original 7 illuminated by light emitting diodes (LEDs) 13 serving as illuminating means is transmitted through a SELFOC lens 11 to be focused onto the photoreceptors 12.

The abutment members 2 consist of slide members, rollers or the like. In the example shown in FIG. 4, the abutment members 2 consist of semi-spherical slide members, and in the example shown in FIG. 5, the abutment members 2 consist of rollers. As shown in FIGS. 4 and 5, support portions are formed on the side surfaces of the casing of the CIS 1, and the slide members or rollers are provided on the support portions. In this embodiment, the abutment members 2 are arranged at four positions spaced apart from each other on the CIS 1; these positions are inwardly spaced apart from the both ends of the main scanning reading range of the CIS 1 by a length corresponding to 20% of the length of the main scanning reading range.

Referring again to FIGS. 1 through 3, the travel body 4 of the image reading apparatus in which the CIS 1 is mounted is driven in a sub-scanning direction along a guide shaft 6 by a motor 9 through a timing belt 10. By thus driving the CIS 1 in the sub-scanning direction, the image information of the original 7 on the original support glass 3 is read.

Figure 6:
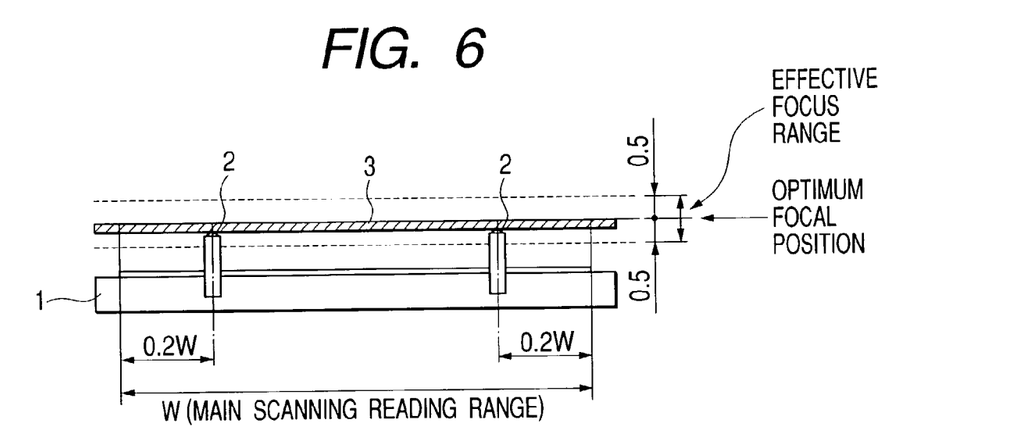
FIG. 6 is a schematic diagram showing the relationship between the effective focus range and the original surface in the image reading apparatus of the first embodiment.

FIG. 6 is a schematic diagram showing the relationship between the effective focus range and the original surface in the image reading apparatus of the first embodiment. As shown in FIG. 6, the focal depth of the SELFOC lens mounted to the CIS 1 of this embodiment is ±0.5 mm, and the effective focus range is a range of 1 mm across the optimum focal position. When there is no load on the original support glass 3 and no deflection is generated, the CIS 1 is held such that the upper surface of the original support glass 3 constituting the original surface substantially coincides with the optimum focal position.

Figure 7:
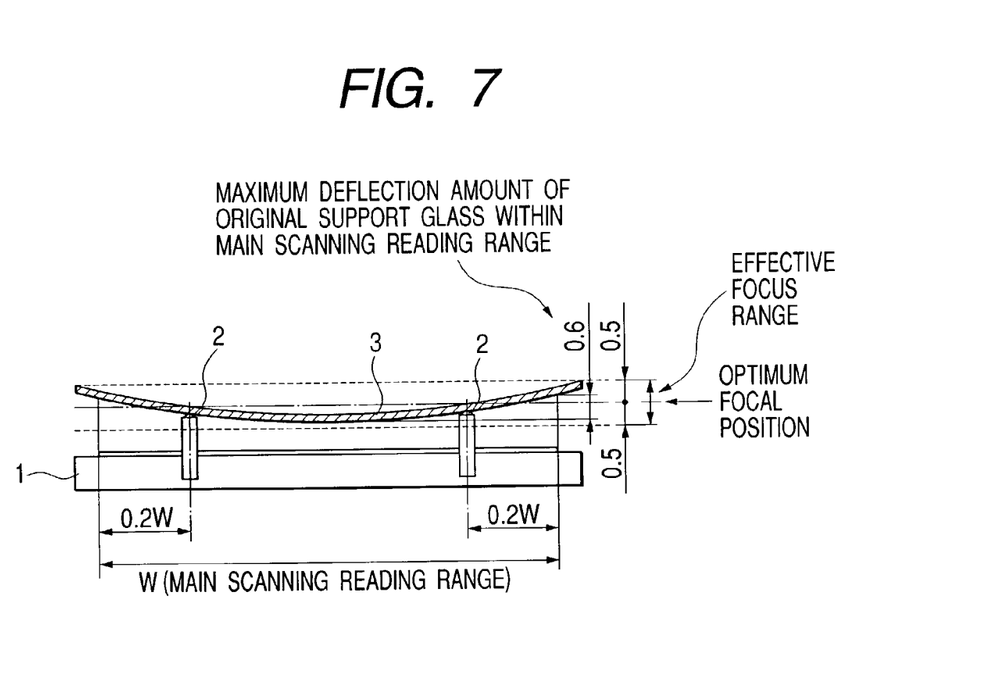
FIG. 7 is a schematic diagram showing a state in which deflection is caused in the original support glass 3 in the image reading apparatus of the first embodiment.

FIG. 7 shows a state in which a thick original 7 such as a book or a dictionary is placed on the original support glass 3 and the original is then pressed with a presser plate 8, thereby causing deflection in the original support glass 3. The deflection amount of the original support glass 3 is maximum in the central portion compared with the both end portions of the main scanning reading range W of the CIS 1. Suppose the central portion is deflected downwardly by 0.6 mm as compared to the end portions of the main scanning reading range W.

To minimize the amount of deviation of the original surface from the optimum focal position, it is desirable to arrange the abutment members 2 at positions in the main scanning direction such that the deflection amount of the original support glass 3 with respect to the both end portions of the main scanning reading range W is ½ of the maximum deflection amount. The positions where the deflection amount of the original support glass 3 is ½ of the maximum deflection amount vary depending upon the configuration and position of the original 7, the method for retaining the original support glass 3, etc.; and generally speaking, they are inwardly spaced apart from the ends of the main scanning reading range W by a length that is 10 to 30% of the length of the main scanning reading range. In the CIS 1 of this embodiment, the positions of abutment members 2 where the deflection amount of the original glass support 3 is ½ of the maximum deflection amount of 0.6 mm, i.e., 0.3 mm, are four positions inwardly spaced apart from the ends of the main scanning reading range W by a length which is 20% of the length of the main scanning reading range W, i.e., 0.2W.

As compared to a case that the original support glass 3 has no deflection, the CIS 1 is pressed down against the force of the springs 5 by a distance corresponding to approximately ½ of the maximum deflection amount of 0.6 mm of the original support glass 3 in the main scanning reading range W, i.e., approximately 0.3 mm. That is, the optimum focal position of the SELFOC lens 11 is downwardly shifted by approximately ½ of the maximum deflection amount of 0.6 mm, i.e., approximately 0.3 mm. As a result, the position of the upper surface of the original support glass 3 constituting the original surface is retained within the effective focus range (focal depth) of the CIS 1 over the entire main scanning reading range, thereby making it possible to effect high quality image reading.

As described above, according to this embodiment, even when the original table is deflected, the original surface is retained within the effective focus range of the contact type image sensor, so that it is possible to perform high quality image reading.

Second Embodiment

In the image reading apparatus of the first embodiment, all the abutment members 2 of the CIS 1 abut the original support glass 3 within the main scanning reading range W. Thus, as image reading is repeatedly conducted, stains caused by the abutment members 2 adhere to the abutment positions of the lower surface of the original support glass 3, so that there is a fear of a deterioration in image quality.

In view of this, in the image reading apparatus of this embodiment, first abutment members 21 are provided at at least two positions (four positions in this embodiment) such that they abut the lower surface of the original support glass 3 in the end portions outside the main scanning reading range W of the CIS 1, and second abutment members 22 are provided at at least two positions (four positions in this embodiment) within the main scanning reading range W of the CIS 1 such that they are vertically spaced apart from the lower surface of the original support glass by a predetermined distance in case that the original support glass 3 is not deflected. The second abutment members 22 are spaced apart by a predetermined distance also in the main scanning direction.

Figure 8:
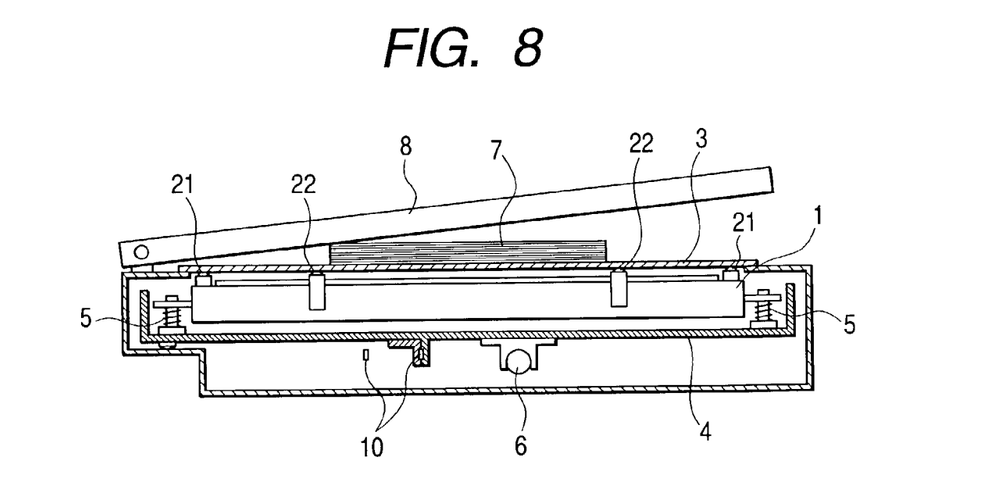
FIG. 8 is a side sectional view of an image reading apparatus according to a second embodiment of the present invention.

FIG. 8 is a side sectional view of the image reading apparatus of the second embodiment. Its basic construction is the same as that of the first embodiment described with reference to FIG. 1. In the end portions of the CIS 1 and outside the main scanning reading range W, the first abutment members 21 are arranged at four positions in such a manner that they abut the lower surface of the original support glass 3 in case that the original support glass 3 has no deflection. Further, the second abutment members 22 are arranged at four positions inwardly spaced apart from the ends of the main scanning reading range W of the CIS 1 by a length which is 20% of the length of the main scanning reading range W so as to be spaced apart from the lower surface of the original support glass 3 by 0.1 mm. The predetermined distance by which the second abutment members 22 are spaced apart from the lower surface of the original support glass 3 is less than ½ of the effective focus range of the CIS 1 (in the case of this embodiment, a range of 1 mm across the optimum focal position). As in the first embodiment, the abutment members 21 and 22 consist of slide members, rollers or the like.

Figure 9:
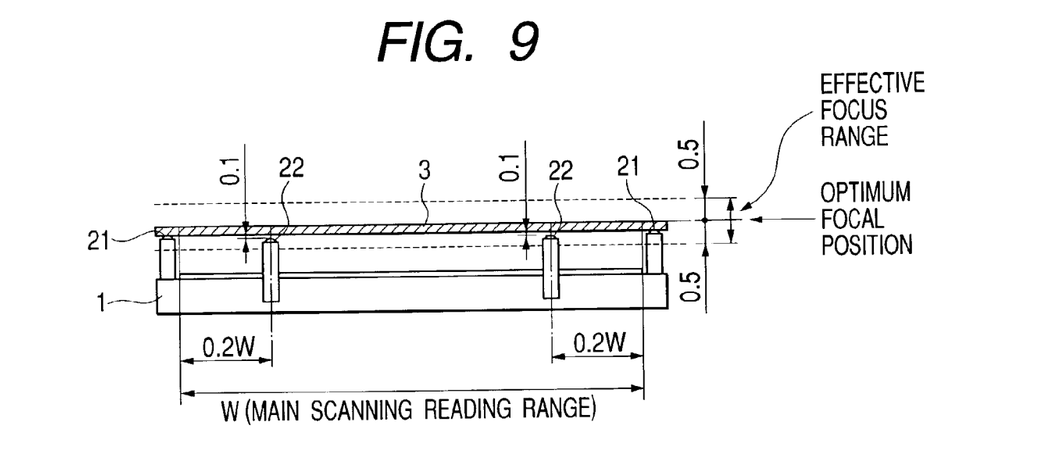
FIG. 9 is a schematic diagram showing the relationship between the effective focus range and the original surface in the image reading apparatus of the second embodiment.

FIG. 9 is a schematic diagram showing the relationship between the effective focus range and the original surface in the image reading apparatus of the second embodiment. As described above in the first embodiment, the focal depth of the SELFOC lens 11 mounted to the CIS 1 of this embodiment is ±0.5 mm, and the effective focus range is a range of 1 mm across the optimum focal position. As shown in FIG. 9, when there is no load on the original support glass 3 and no deflection is generated, the CIS 1 is held such that the first abutment member 21 provided at end portions of the CIS 1 abuts lower surface of the original support glass 3 so that the original surface substantially coincides with the optimum focal position.

Figure 10:
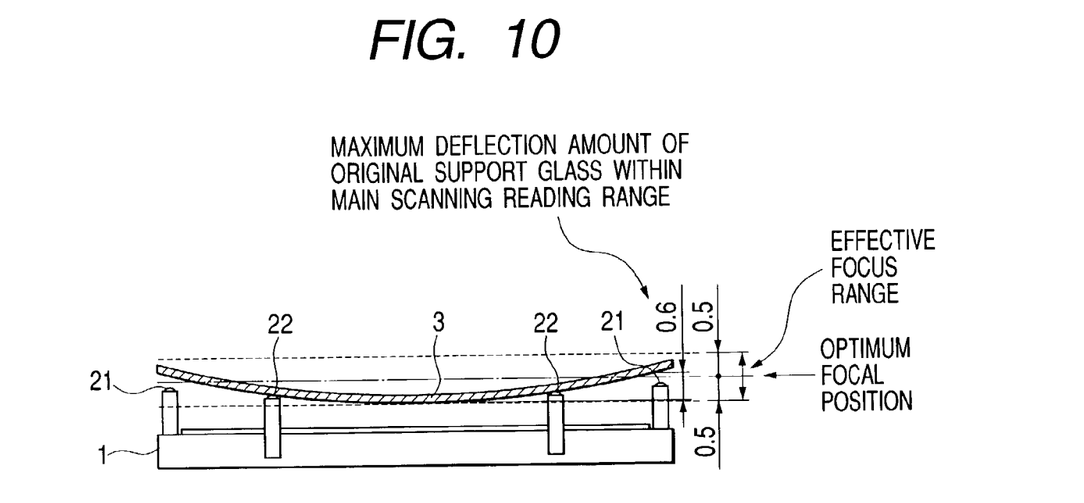
FIG. 10 is a schematic diagram showing a state in which deflection is caused in the original support glass 3 in the image reading apparatus of the second embodiment.

FIG. 10 shows a state in which a thick original 7 such as a book or a dictionary is placed on the original support glass 3 and in which the original is pressed with the presser plate 8 to thereby cause deflection in the original support glass 3.

The deflection amount of the original support glass 3 is maximum in the central portion compared with the end portions of the main scanning reading range W of the CIS 1. Suppose the central portion is deflected downwardly by 0.6 mm as compared to the end portions of the main scanning reading range W.

As compared to a case in which the original support glass 3 has no deflection, the CIS 1 is pressed down by a distance corresponding to approximately 0.2 mm, which is resulted in by subtracting 0.1 mm from approximately ½ of the maximum deflection amount of 0.6 mm of the original support glass 3 in the main scanning reading range W, i.e., approximately 0.3 mm. That is, the optimum focal position of the SELFOC lens 11 is downwardly shifted by approximately 0.2 mm, which is resulted in by subtracting 0.1 mm from approximately of the maximum deflection amount of 0.6 mm, i.e., approximately 0.3 mm. As a result, the position of the upper surface of the original support glass 3 constituting the original surface is retained within the effective focus range (focal depth) of the CIS 1 over the entire main scanning reading range, thereby making it possible to effect high quality image reading.

As described above, according to the present embodiment, even when the original table is deflected, the original surface is retained within the effective focus range of the contact type image sensor. Further, when the original table is not deflected, no stains are generated on the lower surface of the original table, thereby making it possible to effect high quality image reading.

In the second embodiment, in case that the deflection of the original support glass 3 is small since the original 7 is in the form of a sheet or the pressing force of the presser plate 8 is weak even in the case of a thick original, the second abutment members 22 arranged within the main scanning reading range W do not come into contact with the lower surface of the original support glass 3, so that it is possible to minimize the generation of the stains on the lower surface of the original support glass 3. When the original support glass 3 is deflected, the second abutment members 22 arranged within the main scanning reading range W as described above come into contact with the lower surface of the original support glass 3, and the CIS 1 is pressed down from the position where the original support glass 3 has no deflection, and the upper surface of the original support glass 3 constituting the original surface is retained within the effective focus range of the CIS 1 over the entire main scanning reading range W, thereby making it possible to effect high quality image reading.

It is to be noted that the configuration and structure of each portion of the above described embodiments are only shown as an example of the mode for carrying out the present invention, and they should not be construed restrictively. In other words, the present invention can be carried out in various modes without departing from the gist or main features thereof.

What is claimed is:

1. An image reading apparatus comprising:
    an original table which is transparent and has an upper surface on which an original is placed;
    a contact type image sensor arranged on the lower side of said original table;
    a sub-scanning unit arranged to move said contact type image sensor in a sub-scanning direction;
    first abutment members which are provided on said contact type image sensor to maintain a fixed distance between said original table and said contact type image sensor and which are arranged at at least two positions outside an effectively usable main scanning reading range of said contact type image sensor;

a pressing member arranged to press said contact type image sensor so as to cause said abutment members to abut the lower surface of said original table; and second abutment members which are provided on said contact type sensor and arranged within the effectively usable main scanning reading range of said contact type image sensor and which are arranged at two positions which are located on both sides in a main scanning direction of a central portion of the main scanning reading range, where a deflection amount of the original table is maximum, and are vertically spaced apart from the lower surface of said original table by a predetermined distance at least in a case that the original table is not deflected.

2. An image reading apparatus according to claim 1, wherein said second abutment members are arranged at positions where the deflection amount of said original table with respect to the end portions of the effectively usable main scanning reading range of said contact type image sensor is substantially ½ of the maximum deflection amount.

3. An image reading apparatus according to claim 1, wherein said second abutment members are arranged at positions inwardly spaced apart from the end portions of the effectively usable main scanning reading range of said contact type image sensor by a length which is 10 to 30% of the length of the effectively usable main scanning reading range.

4. An image reading apparatus according to claim 1, wherein the predetermined distance is less than ½ of the effective focus range of said contact type image sensor.

* * * * *